(12) United States Patent
O'Brien, II (10) Patent No.: US 7,281,376 B2
(45) Date of Patent: Oct. 16, 2007

(54) HYDRAULIC HYBRID POWERTRAIN SYSTEM

(75) Inventor: James A. O'Brien, II, La Salle, MI (US)

(73) Assignee: Hybra-Drive Systems, LLC, Deerfield, MI (US)

( * ) Notice: Subject to any disclaimer, the term of this patent is extended or adjusted under 35 U.S.C. 154(b) by 0 days.

(21) Appl. No.: 11/359,728

(22) Filed: Feb. 22, 2006

(65) Prior Publication Data

US 2006/0185356 A1   Aug. 24, 2006

Related U.S. Application Data

(63) Continuation-in-part of application No. 11/101,837, filed on Apr. 8, 2005, now Pat. No. 7,179,070.

(60) Provisional application No. 60/655,221, filed on Feb. 22, 2005.

(51) Int. Cl.
*F15B 11/02* (2006.01)
*F16H 59/18* (2006.01)
*E02F 9/22* (2006.01)

(52) U.S. Cl. ............................ 60/493; 60/460; 180/244

(58) Field of Classification Search .................. 60/459, 60/460, 466, 493; 180/242, 244, 307
See application file for complete search history.

(56) References Cited

U.S. PATENT DOCUMENTS

| | | |
|---|---|---|
| 60,365 A | 12/1866 | Hardy |
| 815,522 A | 3/1906 | Fraser |
| 2,293,126 A | 8/1942 | Fersing |
| 2,484,789 A | 10/1949 | Hill et al. |
| 2,754,765 A | 7/1956 | Joy |
| 3,110,265 A | 11/1963 | Miller |
| 3,549,209 A | 12/1970 | Moericke |
| 3,588,295 A | 6/1971 | Burk |
| 3,805,526 A | 4/1974 | Charron |
| 3,827,239 A | 8/1974 | Ulrich, Jr. |
| 3,894,606 A * | 7/1975 | Hunck et al. ................ 180/307 |
| 3,906,727 A | 9/1975 | Hull |
| 4,072,131 A | 2/1978 | Pentel |
| 4,131,171 A | 12/1978 | Keyes |
| 4,196,587 A | 4/1980 | Shiber |
| 4,242,922 A | 1/1981 | Baudoin |
| RE31,067 E | 10/1982 | Roberts |
| 4,426,199 A | 1/1984 | Wüsthof et al. |

(Continued)

*Primary Examiner*—Thomas E. Lazo
(74) *Attorney, Agent, or Firm*—Fraser Clemens Martin & Miller LLC; William J. Clemens (57) ABSTRACT

A hydraulic hybrid powertrain system includes a power plant generating a high pressure fluid at an output, at least one drive motor responsive to the high pressure fluid for generating rotary motion at an output, and a mode selection device connected to the power plant output and the drive motor for selecting a mode of operation from a plurality of drive motor modes of operation including at least two of a drive mode, a neutral mode, a reverse mode and a park mode. The system includes a control device connected to the power plant and the drive motor for controlling operation of the drive motor in the plurality of modes of operation, a selectively actuated brake device for interrupting high pressure fluid flow to the drive motor, and a check valve bridge circuit for connecting the drive motor to a low pressure fluid source when the brake device is actuated.

27 Claims, 9 Drawing Sheets

U.S. PATENT DOCUMENTS

| | | | |
|---|---|---|---|
| 4,484,655 A | 11/1984 | Sheppard, Sr. | |
| 4,492,539 A | 1/1985 | Specht | |
| 4,493,622 A | 1/1985 | Miller | |
| 4,545,748 A | 10/1985 | Middlekauf | |
| 4,563,136 A | 1/1986 | Gervais et al. | |
| 4,740,142 A | 4/1988 | Rohs et al. | |
| 4,812,111 A | 3/1989 | Thomas | |
| 4,824,347 A | 4/1989 | Diugokecki | |
| 5,056,315 A | 10/1991 | Jenkins | |
| 5,184,947 A | 2/1993 | Coombe | |
| 5,305,721 A | 4/1994 | Burtis | |
| 5,306,127 A | 4/1994 | Kinney | |
| 5,335,750 A * | 8/1994 | Geringer et al. | 180/307 |
| 5,540,299 A * | 7/1996 | Tohda et al. | 180/242 |
| 5,620,315 A | 4/1997 | Pfuhler | |
| 5,724,812 A | 3/1998 | Baker | |
| 5,784,883 A * | 7/1998 | Ohkura et al. | 60/327 |
| 5,907,952 A | 6/1999 | Akasaka et al. | |
| 6,006,519 A | 12/1999 | Hormell, Jr. | |
| 6,244,839 B1 | 6/2001 | Cole et al. | |
| 6,283,735 B1 | 9/2001 | Schreiber et al. | |
| 6,553,759 B2 | 4/2003 | Matsufuji | |
| 6,758,656 B2 | 7/2004 | Maier et al. | |
| 6,862,885 B1 | 3/2005 | Mitchell | |
| 6,877,577 B1 * | 4/2005 | Smith | 180/242 |
| 6,971,232 B2 | 12/2005 | Singh | |
| 2001/0024618 A1 | 9/2001 | Winmill | |
| 2003/0116368 A1 | 6/2003 | Winkelman et al. | |
| 2005/0044873 A1 | 3/2005 | Tamai et al. | |
| 2005/0178115 A1 | 8/2005 | Hughey | |
| 2005/0223706 A1 | 10/2005 | Mitchell et al. | |
| 2005/0247504 A1 | 11/2005 | Gleasman et al. | |

* cited by examiner

HYDRAULIC HYBRID POWERTRAIN SYSTEM

CROSS-REFERENCE TO RELATED APPLICATION

This application is a continuation-in-part of U.S. application Ser. No. 11/101,837 filed on Apr. 8, 2005 now U.S. Pat. No. 7,179,070.

This application claims priority from the provisional application Ser. No. 60/655,221 filed on Feb. 22, 2005.

BACKGROUND OF THE INVENTION

The present invention relates generally to vehicle powertrain systems and, in particular, to a hydraulic hybrid powertrain system.

So-called hybrid powertrains, such as for automotive vehicles, generally refer to a powertrain wherein an internal combustion engine is utilized in combination with an auxiliary motor, such as electric motor or a hydraulic motor, to drive the vehicle. Hybrid powertrain systems known as parallel hybrids include a typical mechanical drivetrain (coupled to the internal combustion engine) along with the auxiliary drivetrain (coupled to the auxiliary motor). These systems are disadvantageously high in weight because of the necessary duplication of parts. Hybrid drive systems known as series hybrids do away with the mechanical powertrain and drive the vehicle solely by a hydraulic motor or motors while utilizing an engine to provide the necessary hydraulic pressure for the hydraulic motor. These systems are more attractive because of the potential reduction in weight and resultant efficiency gains. While the attractiveness of such a hydraulic hybrid powertrain has been recognized, there remain many efficiency issues regarding the operation and control of the engine with respect to the hydraulic drive motor.

It is desirable, therefore, to provide a hydraulic hybrid powertrain system that provides increased efficiency of the entire hydraulic hybrid powertrain system.

SUMMARY OF THE INVENTION

The present invention concerns a hydraulic hybrid powertrain system that includes a power plant generating a high pressure fluid at an output, at least one drive motor responsive to the high pressure fluid for generating rotary motion at an output, and a mode selection means connected to the power plant output and the at least one drive motor for selecting a mode of operation from a plurality of modes of operation of the at least one drive motor including at least two of a drive mode, a neutral mode, a reverse mode and a park mode. The system also includes a control means connected to the power plant and the at least one drive motor for controlling operation of the at least one drive motor in the plurality of modes of operation, a selectively actuated brake means for interrupting a flow of the high pressure fluid to the at least one drive motor, and a check valve bridge circuit for connecting the at least one drive motor to a low pressure fluid source when the brake means is actuated.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1d is a view of the hydraulic hybrid powertrain system of FIG. 1a with the mode select valve in a "Park" position;

DESCRIPTION OF THE PREFERRED EMBODIMENT

The following patent applications are incorporated herein by reference: U.S. patent application Ser. No. 60/655,221 filed on Feb. 22, 2005; U.S. patent application Ser. No. 11/101,837 filed on Apr. 8, 2005.

Figure 1A:
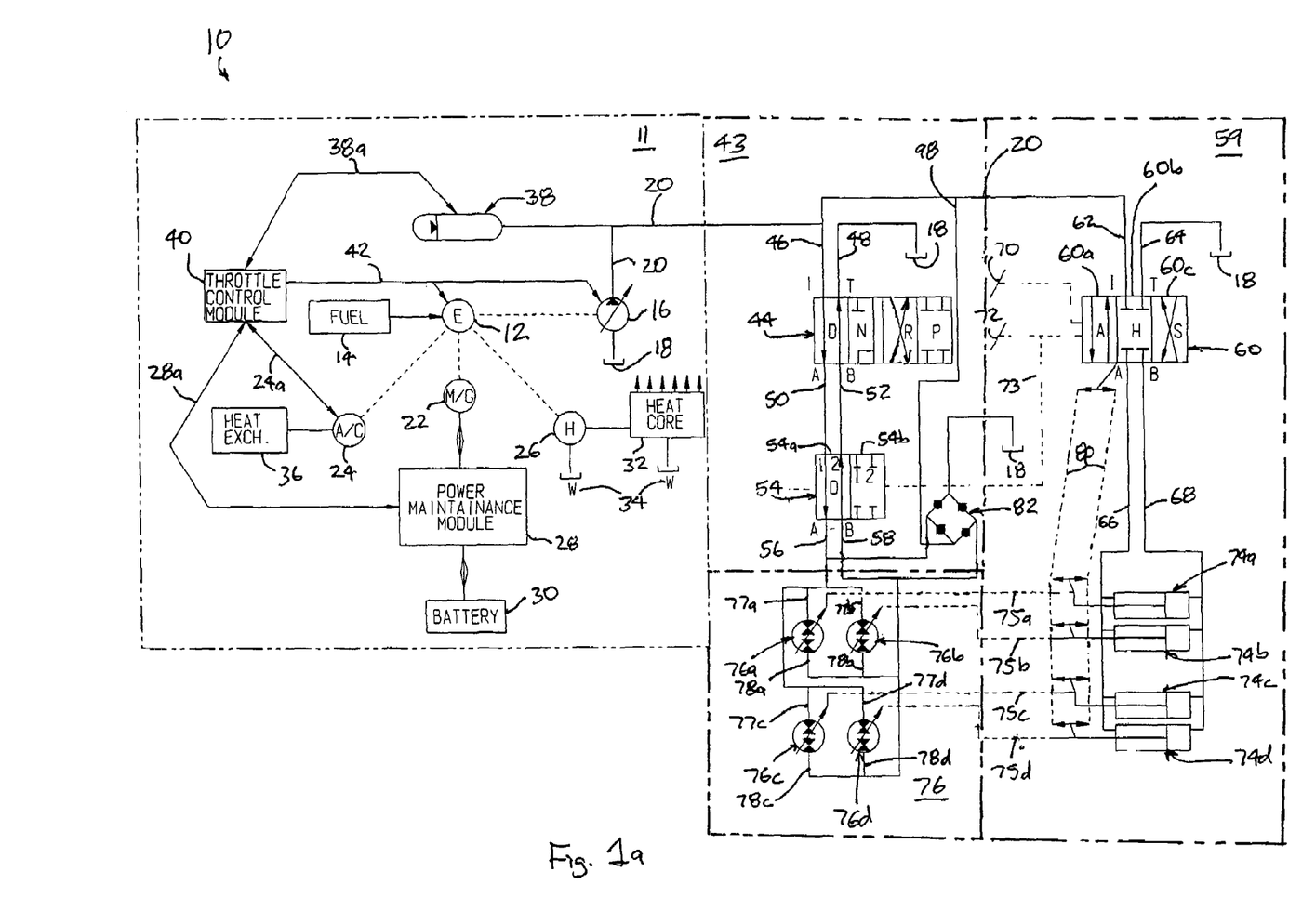
FIG. 1a is a schematic view of a hydraulic hybrid powertrain system in accordance with the present invention with a mode select valve in a "Drive" position.

Referring now to FIG. 1a, a hydraulic hybrid powertrain system in accordance with the present invention is indicated generally at 10. The powertrain system 10 may be utilized in a variety of installations, such as, but not limited to, an automotive vehicle, a boat, a submarine, a helicopter, or the like as will be appreciated by those skilled in the art, but for clarity will be referred to as if installed in an automotive vehicle in the following description of the present invention. The powertrain system 10 includes a power plant section 11, a mode selector module 43, a control section 59, and a power delivery section 76.

The power plant section 11 of the powertrain system 10 includes an engine 12 in communication with a fuel source 14. The engine 12 may be a conventional internal combustion engine, a turbine engine, an electric motor powered by a battery, a fuel cell, or the like. The engine 12 selectively provides torque to a preferably variable displacement hydraulic pump/motor 16, which is supplied with a low pressure source 18 of hydraulic fluid on an inlet side thereof and a high pressure conduit 20 on an outlet side thereof. The hydraulic fluid may be a liquid, such as but not limited to water, hydraulic fluid, transmission fluid or the like, or any compressible gas while remaining within the scope of the present invention. The pump/motor 16 is described as such because, depending on the mode of the system 10, the device functions alternately as a pump or a motor, discussed in more detail below.

The power plant section 11 of the system 10 includes a plurality of accessory drives including, but not limited to, a motor generator 22, an air conditioning compressor 24, and a heat pump 26. The motor generator 22 is connected to a power maintenance module 28, which is in turn connected to a battery pack 30. The heat pump 26 is in communication with a heater core 32 and both the heat pump 26 and the heater core 32 are in fluid communication with a cooling water source 34 for the engine 12. The air conditioning compressor 24 is in communication with a heat exchanger 36. The accessory drives 22, 24, and 26 are preferably run by respective electric or hydraulic motors. Alternatively, the accessory drives 22, 24, and 26 are selectively mechanically clutched to the engine 12. An accumulator 38 is in fluid communication with the high pressure conduit 20 on the outlet of the pump/motor 16. The accumulator 38 serves as a reservoir for high pressure hydraulic fluid and maintains high pressure in the system 10, such as by being charged with a high pressure gas or the like (not shown), as will be appreciated by those skilled in the art.

A throttle control module 40 receives an input signal from the air conditioning compressor 24 via a signal on a line 24a, the power maintenance module 28 via a signal on a line 28a, and the accumulator 38 via a signal on a line 38a. Based on the input signals on the lines 24a, 28a, and 38a, the throttle control module 40 provides an output signal on a line 42 to control either or both of the engine 12 and the pump/motor 16, discussed in more detail below. The signals on the lines 24a, 28a, 38a, and 42 may be electronic signals or mechanical feedback between the various components and the throttle control module 40. The throttle control module 40 can be any suitable mechanical or electrical device operable to control the operation of the engine 12 and the pump/motor 16 based on one or more inputs.

The mode selector module 43 includes a mode select valve 44 that is in fluid communication with the high pressure conduit 20 by a high pressure inlet conduit 46. The mode select valve 44 is preferably connected to a transmission-like shift lever (not shown) or the like for selectively moving the valve 44 into a one of a "D" or drive position (best seen in FIG. 1a), a "N" or neutral position (best seen in FIG. 1b), a "R" or reverse position (best seen in FIG. 1c), and a "P" or park position (best seen in FIG. 1d). The mode select valve 44 includes a low pressure inlet conduit 48 connected thereto adjacent the high pressure inlet conduit 46. The mode select valve 44 also includes a high pressure outlet conduit 50 and a low pressure outlet conduit 52 connected thereto and on an opposing side of the mode select valve 44. Each position P, R, N, D of the mode select valve 44 selectively aligns the internal portion of the position with the conduits 46, 48, 50, and 52 and controls the direction of hydraulic fluid flow in the system 10, discussed in more detail below. While described as "inlet" and "outlet" above during operation each of the conduits 46, 48, 50, and 52 may function as an inlet or an outlet depending on the operating condition of the system 10, discussed in more detail below.

The conduits 50 and 52, in turn, are connected to a brake override device 54. The brake override device 54 also includes a high pressure outlet conduit 56 and a low pressure outlet conduit 58 connected thereto on an opposing side of the brake override device 54. The brake override device 54 has a first or normal position 54a and a second or override position 54b, discussed in more detail below.

Figure 2:
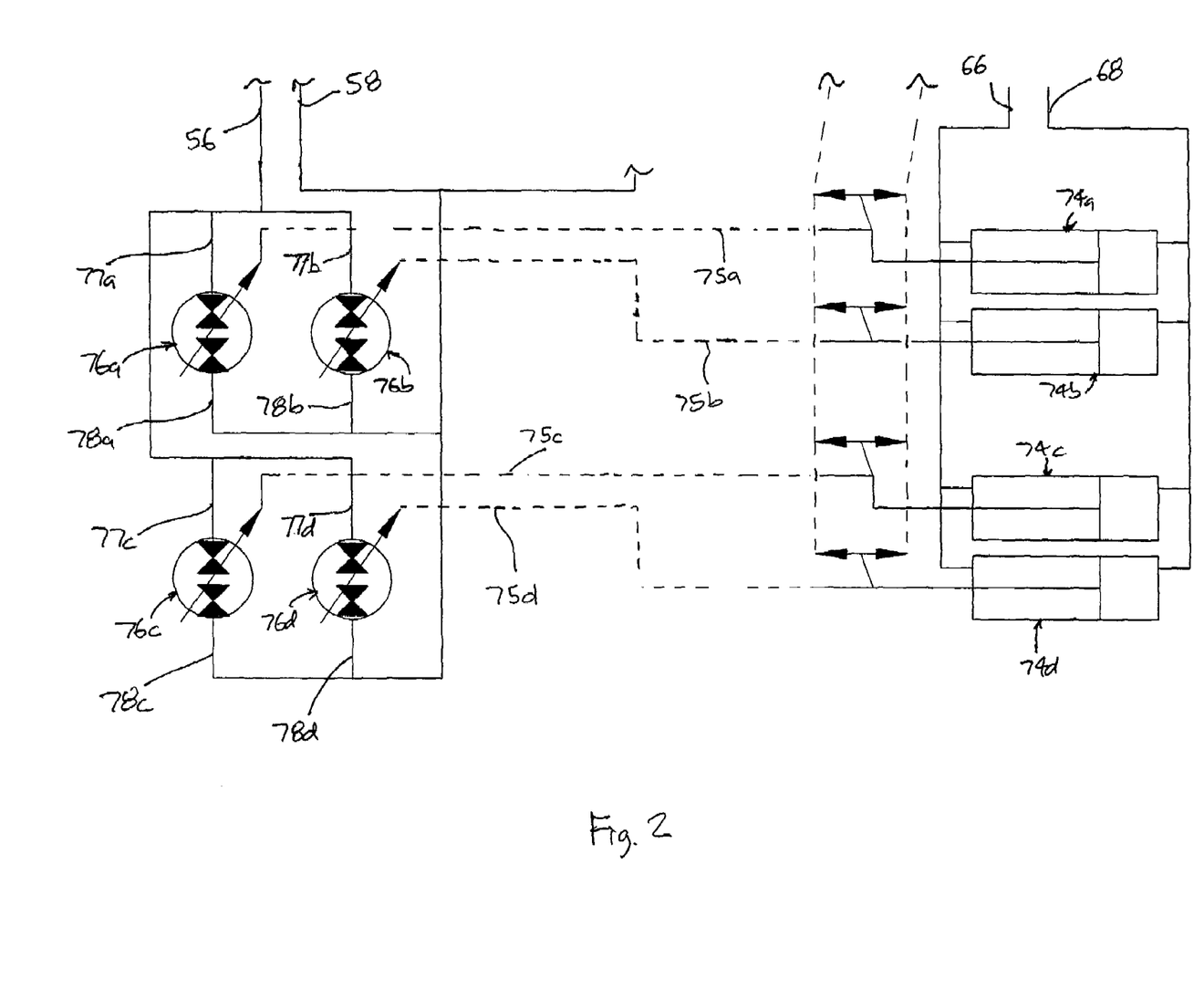
FIG. 2 is a schematic view in an enlarged scale of the drive motors and displacement control devices shown in FIGS. 1a-1d.

The control section 59 includes a displacement control valve 60 that is in fluid communication with the high pressure conduit 20 by a high pressure inlet conduit 62. The displacement control valve 60 includes a low pressure inlet conduit 64 connected thereto adjacent the high pressure inlet conduit 62. The displacement control valve 60 also includes a high pressure outlet conduit 66 and a low pressure outlet conduit 68 connected thereto on an opposing side of the displacement control valve 60. The displacement control valve 60 is a floating positional valve and includes an accelerator 70 and a brake 72 connected thereto for directing flow from the displacement control valve 60 to a plurality of cylinders 74a, 74b, 74c, and 74d. The accelerator 70 and brake 72 are preferably mechanically connected to a respective accelerator pedal and a brake pedal (not shown). The brake 72 is connected to the brake override device 54 via a connector 73. The displacement control valve 60 has a first or acceleration position 60a, a second or hold position 60b, and a third or deceleration position 66c. Each position 60a, 60b, and 60c of the displacement control valve 60 selectively aligns the internal portion of each position 60a, 60b, and 60c with the conduits 62, 64, 66, and 68 and controls the direction of hydraulic fluid flow to the cylinders 74a, 74b, 74c, and 74d, best seen in FIG. 2.

Each of the cylinders 74a, 74b, 74c, and 74d is mechanically connected via a connector 75a, 75b, 75c, and 75d, to a respective and drive or traction motor 76a, 76b, 76c, and 76d (in the power delivery section 76), on each of the vehicle wheels. The motors 76a-76d are preferably variable displacement motors. The position of the connectors 75a-75d determines the displacement of the motors 76a-76d, as will be appreciated by those skilled in the art such as by a connection to a swash plate or the like. The high pressure outlet conduit 66 is in fluid communication with one side of a piston (not shown) in each of the cylinders 74a-74d and the low pressure outlet conduit 68 is in fluid communication with an opposite side of the piston in the cylinders 74a-74d. While the system 10 is illustrated with a plurality of traction motors 76a, 76b, 76c, and 76d, those skilled in the art will appreciate that as few as one motor may be utilized while remaining within the scope of the present invention. For example, in a single motor installation in an automotive vehicle, the output of the single motor is connected to a differential gear which is in turn mechanically connected to a pair of drive wheels. Each of the traction motors 76a, 76b, 76c, and 76d have an upper port 77a, 77b, 77c, and 77d and a lower port 78a, 78b, 78c, and 78d. The direction of the fluid flow through the upper ports 77a-77d and the lower ports 78a-78d determines the direction of the motors 76a-76d. A feedback connector 80 extends between the displacement control valve 60 and the pistons of the cylinders 74a-74d.

Figure 3:
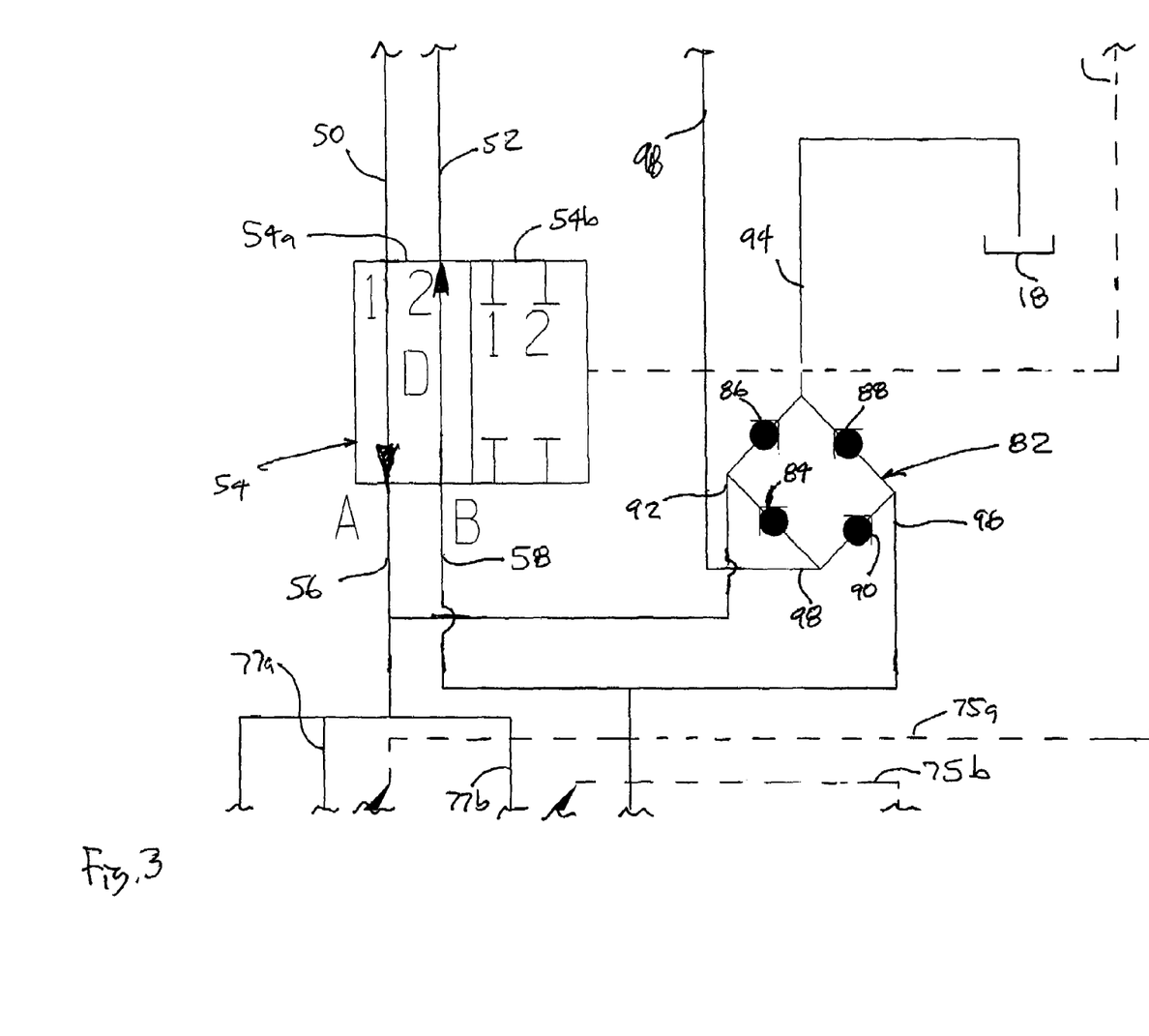
FIG. 3 is a schematic view in an enlarged scale of the brake override device and check valve bridge circuit shown in FIGS. 1a-1d.

A check valve bridge circuit 82 includes a plurality of check valves 84, 86, 88, and 90 and is arranged in a manner similar to a full-wave bridge rectifier, best seen in FIG. 3. A conduit 92 is in fluid communication with an inlet of the check valve 84 and an outlet of the check valve 86. The conduit 92 is also in fluid communication with the high pressure outlet conduit 56. A conduit 94 is in fluid communication with an inlet of the check valve 86 and an inlet of the check valve 88. The conduit 94 is also in fluid communication with the low pressure source of hydraulic fluid 18. A conduit 96 is in fluid communication with an outlet of the check valve 88 and an inlet of the check valve 90. The conduit 96 is also in fluid communication with the low pressure outlet conduit 56. A conduit 98 is in fluid communication with an outlet of the check valve 84 and an outlet of the check valve 90. The conduit 98 is also in fluid communication with the high pressure conduit 20.

The pump/motor 16 and the motors 76a-76d are preferably variable displacement pump/motors such as that shown in commonly assigned and co-pending patent application Ser. No. 11/101,837 filed on Apr. 8, 2005, the disclosure of which is hereby incorporated by reference and shown in FIGS. 4 and 5. Alternatively, the pump/motor 16 and the motors 76a-76d are vane-type or piston-type variable displacement pump/motors or are fixed displacement pump/motors.

Figure 4:
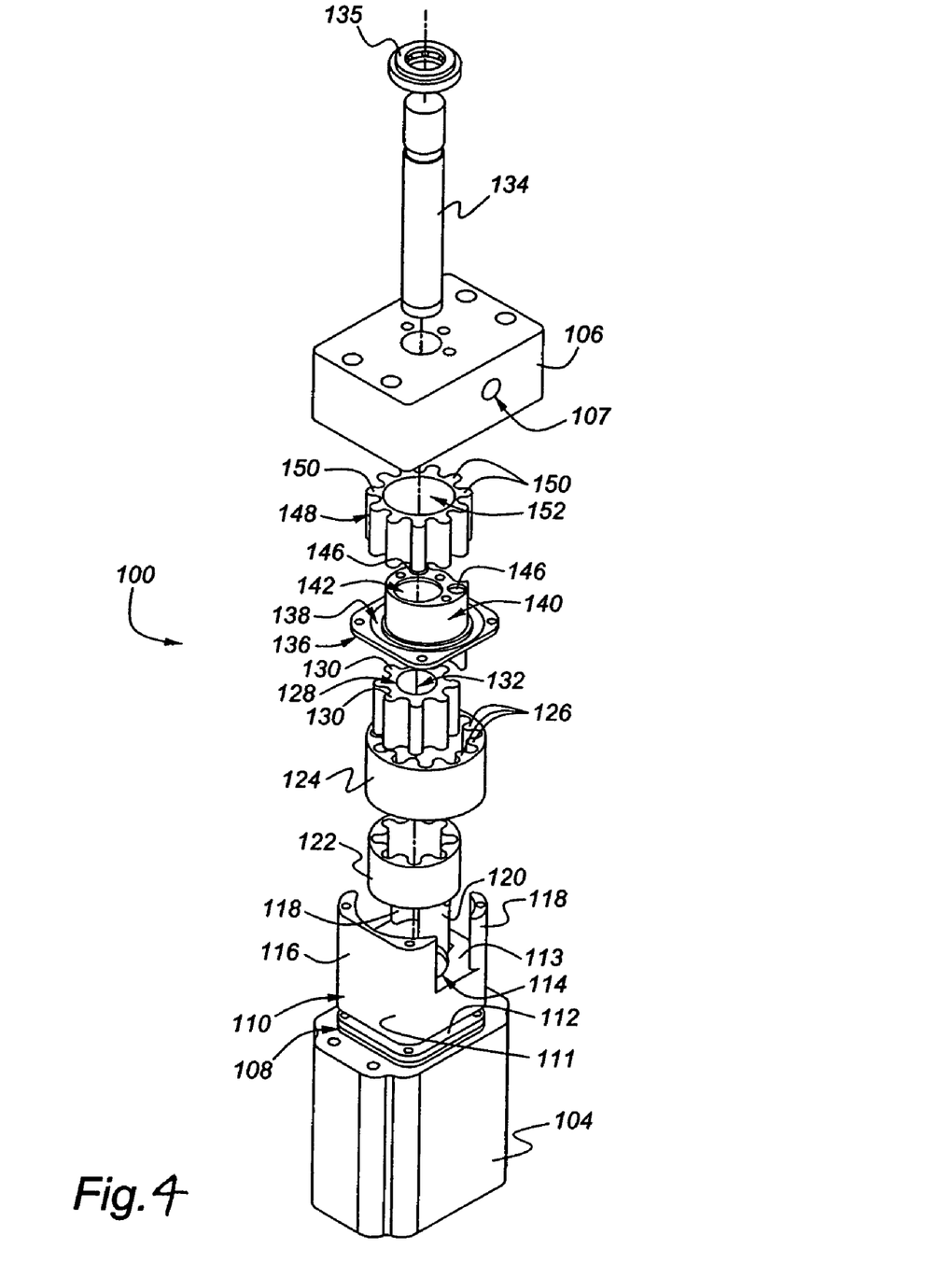
FIG. 4 is an exploded perspective view of an internal gear pump/motor in accordance with the present invention.

Referring now to FIG. 4, an internal gear apparatus in accordance with the present invention is indicated generally at 100. The apparatus 100 may be configured to operate as a motor or as a pump as will be appreciated by those skilled in the art, but will be referred to as a motor in the following description of the present invention. The internal gear motor 100 includes a hollow housing 102 having a base portion 104 and an end cap 106. The base portion 104 defines a recess or cavity 108 therein that is sized to receive a first mandrel 110 and a first piston member 112. The end cap 106 includes at least two ports 107 (only one is shown) that each extend between an internal and an external surface thereof, preferably on opposite sides of the end cap 106. One of the ports 107 is connected to a high pressure segment of a fluid system such as the high pressure conduit 20 of FIGS. 1a-1e, and another of the ports 107 is connected to a return line or fluid source such as the fluid source 18 of FIGS. 1a-1e.

The first mandrel 110 defines an aperture 114 extending through a base portion 111 thereof and includes a first outer flange 116 and a plurality of spaced apart second outer flanges 118 extending upwardly from an upper surface 113 of the base portion 111. An inner flange 120 extends upwardly from the base portion 111 of the first mandrel 110 and is located adjacent the aperture 114. The first outer flange 116 is located adjacent the aperture 114. The second outer flanges 118 are spaced apart from both the aperture 114 and the inner flange 120. A first seal bushing 122 is sized to rotatably fit in the aperture 114 and is preferably substantially equal in height to the base portion 111 of the first mandrel 110 such that when the bushing 122 is placed in the aperture 114, an upper surface of the bushing 122 is substantially flush with the upper surface 113 of the base portion 111.

An external gear 124 that is substantially circular in cross section is adapted to be placed atop the upper surface 113 of the base portion 111 wherein a curved outer surface of the gear 124 is adjacent the respective curved inner surfaces of the outer flanges 116 and 118. The external gear 124 includes a plurality of teeth 126 formed on an inner surface thereof. When placed on the upper surface 113, the gear 124 is fixed axially between the outer flanges 118 and the inner flange 120.

An internal gear 128 that is substantially circular in cross section includes a plurality of teeth 130 formed on an outer surface thereof and defines an aperture 132 extending therethrough. The teeth 130 are operable to mesh with the teeth 126 formed on the inner surface of the external gear 124. A lower surface of the gear 128 extends into and rotates with the bushing 122, wherein the teeth 130 cooperate with corresponding teeth on the bushing 122 when the motor 100 is assembled and operated, as discussed in more detail below. The respective outer surfaces of the teeth 130 of the internal gear 128 are adjacent the inner surface of the inner flange 120. The aperture 132 is adapted to receive a free end of a drive or output shaft 134 when the motor 100 is assembled. The internal gear 128 is axially moveable along the shaft 134. The drive shaft 134 is rotatably supported in the end cap 106 by a bearing 135, such as a ball bearing, a roller bearing or the like. The free end of the drive shaft 134 extends a predetermined distance beyond the upper surface of the end cap 106 and acts as an output shaft for the motor 100.

A second piston member 136 defines an aperture 138 on an interior portion thereof and is adapted to be mounted on respective upper surfaces of the outer flanges 116 and 118 of the first mandrel 110. The second piston 136 and the first piston 112, therefore, are mounted on the upper surface and the lower surface, respectively of the lower mandrel 110.

A second mandrel 140 is adapted to be disposed in the aperture 138 of the second piston member 136 and defines an aperture 142 on an interior portion thereof for receiving the drive shaft 134. The second mandrel 140 includes a downwardly extending flange 144 that cooperates with the upwardly extending inner flange 120 of the first mandrel 110 when the motor 100 is assembled. The upper mandrel 140 includes a pair of bores 146 extending therethrough for fluid communication with the gears 122 and 124 during operation of the motor 100.

A second seal bushing 148 includes a plurality of teeth 150 formed on an exterior surface thereof and defines an aperture 152 extending therethrough. The second seal bushing 148 is adapted to receive the upper mandrel 140 in the aperture 152 and be received in the external gear 124 and rotates therewith, wherein the teeth 126 cooperate with the teeth 150 on the bushing 148 when the motor 100 is assembled and operated, as discussed in more detail below.

When the motor 100 is assembled, the first mandrel 110 and the first piston 112 are placed in the base portion 104 of the housing 102, the first seal bushing 122 is placed in the mandrel 110, and the external gear 124 is placed on the mandrel 110. The internal gear 132 and the second mandrel 138 are mounted on the drive shaft 134 and assembled such that the respective teeth 126 and 130 of the gears 132 and 124 rotatably mesh and the internal gear 132 engages with the first seal bushing 122. The second piston 136 is attached to the upper surface of the mandrel 110, and the second seal bushing 148 is placed on the second mandrel 138 and engages with the external gear 124. The downwardly extending flange 144 cooperates with the upwardly extending inner flange 120 to divide the interior of the external gear into an inlet chamber and discharge chamber of the motor 100 and the upper end cap 106 is attached to the base portion 104 to enclose the housing 102. The flanges 120 and 144 extend radially between the teeth 126 and the teeth 130 to form the inlet chamber on one side of the flanges and the discharge chamber on the other side of the flanges.

In operation, the shaft 134 is connected to a load (not shown), such as a wheel of a vehicle or the like. Pressured fluid is introduced from the fluid system such as from the high pressure conduit 20 of FIGS. 1a-1e, through one of the ports 107, is routed to the inlet chamber side of the gears 124 and 128 through the bores 146, acts against the meshing teeth 126 and 130 to rotate the gears and the shaft, flows between the teeth to the discharge chamber and is discharged through the other the bores 146 to the other of the ports 107. The first seal bushing 122 provides a rotating seal between the internal gear 128 and the first mandrel 110 and the second seal bushing 148 provides a rotating seal between the external gear 124 and the second mandrel 140 to ensure the integrity of the inlet and discharge chambers. The motor 100 in accordance with the present invention requires only the seals 122 and 148 to maintain a fluid seal and allow for efficient operation of the motor 100.

The normal or default spatial relationship between the teeth 126 and 130 of the gears 124 and 128 is such that the teeth 126 and 130 engage substantially all of the axial area of the teeth. In such a relationship, the motor 100 produces its maximum volume flow or maximum output. The motor 100 in accordance with the present invention may advantageously vary from its maximum displacement because the internal gear 128 is axially movable along the shaft 134.

When the internal gear 128 moves towards the first mandrel 110, less of the axial area of the teeth 126 and 130 engage, which reduces the volume flow or displacement of the motor 100.

When the unit 100 is configured as a motor, an external source of pressure, such as hydraulic fluid from an external hydraulic pump, compressed air from an air compressor or the like, provides a volume flow to the ports 107 to spin the gears 124 and 128 and produce an output torque on the shaft 134. As the pressure is varied, the internal gear 128 will move along the axis of the shaft 134 in order to vary the output horsepower of the motor 100. The motor 100 may be advantageously utilized to control output rpm under widely changing output loads including, but not limited to automotive vehicles, turrets, large machinery, earth movers, large well drills, ships, farm equipment, or the like.

When the unit 100 is configured as a pump and a prime mover, such as the engine 12 of FIGS. 1a-1e, rotates the shaft 134 at a lower speed or with a lower torque, the pump 100 will react to the reduced input speed or input torque by varying its output based on the internal pressures in the pump housing 102. In this condition, the output port 107 will create a higher back pressure in the discharge chamber, and the internal gear 128 will move along the axis of the shaft 134 to a point along the axis where the gear 128 is at or near equilibrium to continue operation. The pump 100, therefore, can vary from a maximum output or displacement where the internal gear 128 is substantially adjacent the upper mandrel 140 to a minimum displacement where the internal gear 128 is substantially adjacent the lower mandrel 110.

Figure 5:
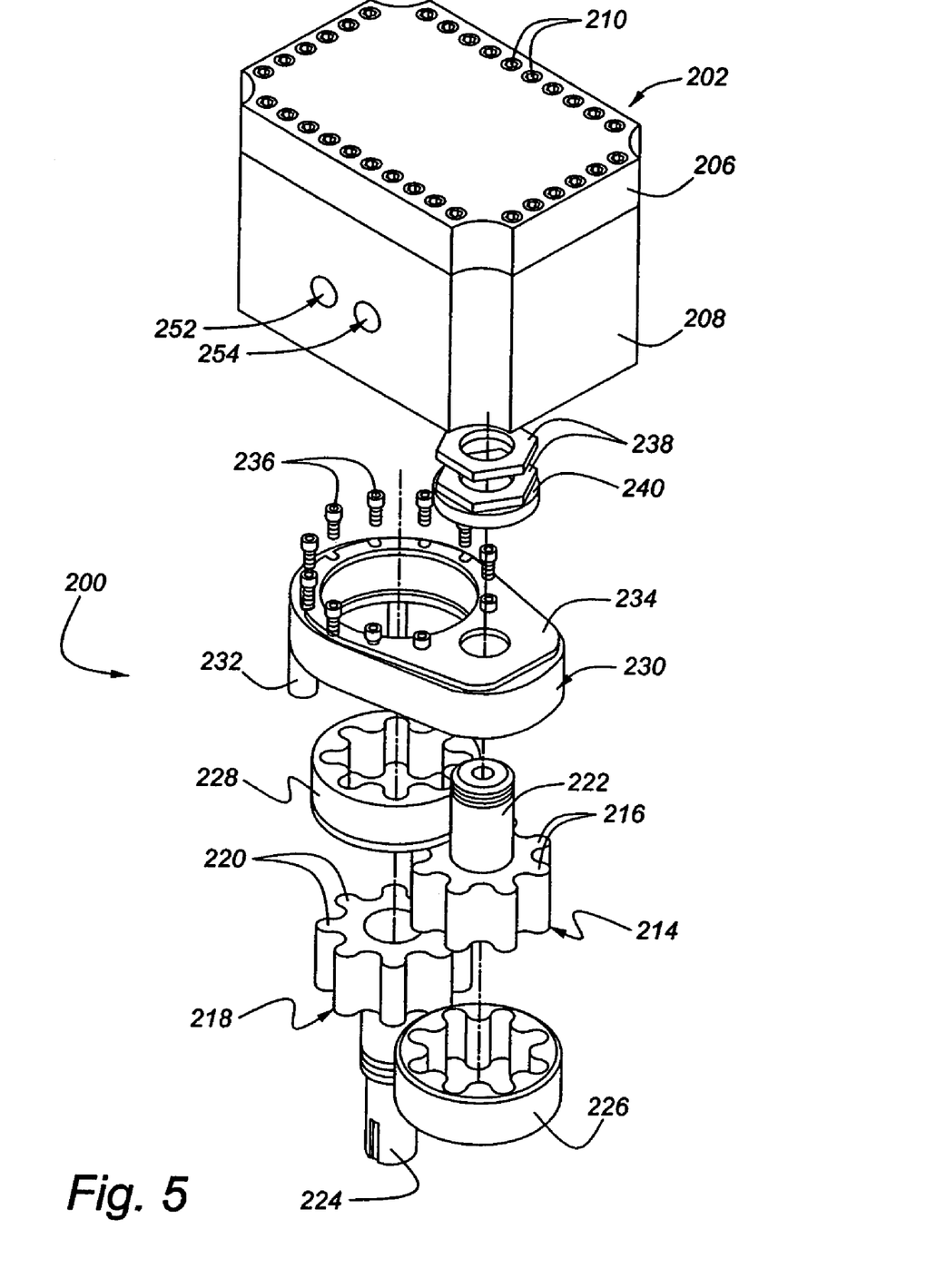
FIG. 5 is a partial exploded perspective view of an external gear pump/motor in accordance with the present invention.

Referring now to FIG. 5, an external gear apparatus in accordance with the present invention is indicated generally at 200. The apparatus 200 may be configured to operate as a pump or a motor as will be appreciated by those skilled in the art, but will be referred to as a pump in order to simplify the description of the present invention. The external gear pump 200 includes a hollow housing 202 having a first end cap 204 and a second end cap 206 connected by a body portion 208. Preferably, the first end cap 204 and the second end cap 206 are attached to the body portion 208 by a plurality of fasteners 210, such as high strength bolts or the like. The body portion 208 defines a recess 212 therein.

A first gear 214 having a plurality of teeth 216 formed on an external surface thereof and a second gear 218 having a plurality of teeth 220 formed on an external surface thereof are adapted to be disposed in the recess 212 of the housing 202. The teeth 216 and 220 of the respective gears 214 and 218 are operable to rotatably mesh in the recess or pump cavity 212 during operation of the pump 200. The first gear 214 has a shaft 222 extending therefrom and the second gear 216 has a stepped shaft 224 extending therefrom. The first gear 214 is fixed on the shaft 222 and the second gear 218 is axially moveable along the shaft 224. The shafts 222 and 224 extend in opposite axial directions and the shaft 224 is greater in length than the shaft 222. A first seal sleeve 226 having internal teeth receives the first gear 214 and a second seal sleeve 228 having internal teeth receives an end of the second gear 218.

A plate fitting 230 includes a flange 232 extending downwardly therefrom and is attached to a first thrust plate 234 on a planar upper surface thereof. Preferably, the thrust plate 234 is attached to the fitting 230 by a plurality of fasteners 236, such as high strength bolts or the like. A free end of the shaft 222 extends through an opening formed in the fitting 230 and the thrust plate 234. The free end of the shaft 222 is rotatably secured in the fitting 230 and the thrust plate 234 by a pair of nuts 238 and is rotatably supported by a bearing 240, such as a ball bearing, a roller bearing or the like. The second seal sleeve 228 is operable to be received in a recess in the fitting 230 adjacent the flange 232. When the shaft 222 is mounted in the fitting 230 and the thrust plate 234, the gear 214 is fixed axially with respect to the housing 202.

A second thrust plate 242 is attached to an upper surface 205 of the first end cap 204 by a plurality of fasteners 244, such as high strength bolts or the like. The plate 242 includes an aperture for receiving a free end of the shaft 224 and a larger aperture for receiving and locating the first seal sleeve 226 adjacent the upper surface of the first end cap 204. The free end of the shaft 224 extends through the aperture in the plate 242, threadably engages a pair of nuts 246 at the step and is rotatably supported by a bearing 248, such as a ball bearing, a roller bearing or the like. The bearing 248 is preferably disposed in a cavity 250 formed in the upper surface 205 of the first end cap 204 while the nuts 246 attach the shaft 224 to the end cap on a lower surface opposite the upper surface 205. The free end of the shaft 224 extends a predetermined distance beyond the lower surface of the end cap 204 and acts as a drive shaft or output shaft for the pump 200.

The body portion 208 defines a first port 252 and a second port 254 that each extend between an internal and an external surface thereof. One of the ports 252 and 254 is connected to a low pressure segment of a fluid system such as the hydraulic fluid source 18 of FIGS. 1a-1e or the like, and another of the ports 252 and 254 is connected to a high pressure or pressurized segment of a fluid system such as the high pressure conduit 20 of FIGS. 1a-1e.

In operation, the shaft 224 is connected to a prime mover, such as the engine 12 of FIGS. 1a-1e or the like. When the prime mover rotates the shaft 224, the gear 218 rotates and causes the gear 214 to rotate. Fluid is introduced from the fluid system through one of the ports 252 or 254, is trapped between the meshing teeth 216 and 220 as is well known in the art and is discharged through the other of the ports 252 or 254. Suitable passages are formed in the housing 202 to ensure that the fluid is routed correctly during operation of the pump 200. The first seal sleeve 226 provides a rotating seal between the first gear 214 and the upper surface 205 and the second seal sleeve 228 provides a rotating seal between the second gear 218 and the fitting 230 to ensure the integrity of the pump cavity 212. The pump 200 in accordance with the present invention requires only the seal sleeves 226 and 228 to maintain a seal and allow for efficient operation of the pump 200.

The normal or default spatial relationship between the teeth 216 and 220 of the gears 214 and 218 is such that the teeth 216 and 220 engage substantially all of the axial area of the teeth. In such a relationship, the pump 200 produces its maximum volume flow or maximum displacement. The pump 200 in accordance with the present invention may advantageously vary from its maximum displacement because the second gear 218 is axially movable along the shaft 224. When the second gear 218 moves towards the lower thrust plate 242, less of the axial area of the teeth 216 and 220 engage, which reduces the volume flow or displacement of the pump 200. Typically, this will occur when the prime mover rotates the shaft 224 at a lower speed or with a lower torque and the pump 200 will react to the reduced input speed or input torque by varying its output based on the internal pressures in the pump housing 202. In this condition, the output port 252 or 254 will create a higher back pressure in the recess 212, and the second gear 218 will move along the axis of the shaft 224 to a point along the axis where the gear 218 is at or near equilibrium to continue operation. The pump 200, therefore, can vary from a maximum output or displacement where the gear 218 is substantially adjacent the fitting 230 to a minimum displacement where the gear 218 is substantially adjacent the lower thrust plate 242.

When the apparatus 200 is configured as a motor, an external source of pressure, such as hydraulic fluid from an external hydraulic pump, compressed air from an air compressor or the like, provides a volume flow to the ports 252 and 254 to spin the gears 214 and 218 and produce an output torque on the shaft 224. As the pressure is varied, the second gear 218 will move along the axis of the shaft 224 in order to vary the output horsepower of the motor 200. The motor 200 may be advantageously utilized to control output rpm under widely changing output loads including, but not limited to automotive vehicles, turrets, large machinery, earth movers, large well drills, ships, farm equipment, or the like.

In operation of the system 10, the engine 12 is started and supplies torque to the pump/motor 16, which in turn supplies pressurized hydraulic fluid to the high pressure conduit 20. The accumulator 38 ensures that the hydraulic pressure within the conduit 20 remains relatively stable and provides energy storage in a manner well known to those skilled in the art. The pressure in the conduit 20 is transmitted to the conduits 46, 62, and 98.

Referring to FIG. 1a, when the mode select valve 44 is in the D or drive position and the brake override device 54 is in the 54a position, hydraulic fluid will flow through the conduit 46, through the mode select valve 44 and out the conduit 50 in the direction shown by the arrow in the D position, through the brake override device 54 and out the conduit 56 in the direction shown by the arrow in the 54a position, and to the respective upper ports 77a-77d of the motors 76a-76d, through the motors 76a-76d and to the respective lower ports 78a-78d, dropping in pressure and providing an output torque in a forward direction for each of the motors 76a-76d in a manner known to those skilled in the art. The lower pressure hydraulic fluid in the lower ports 78a-78d travels through the conduit 58, through the brake override device and out the conduit 52 in the direction shown by the arrow in the 54a position, and through the mode select valve 44 and out the conduit 48 in the direction shown by the arrow in the D position to the hydraulic fluid source 18.

Figure 1B:
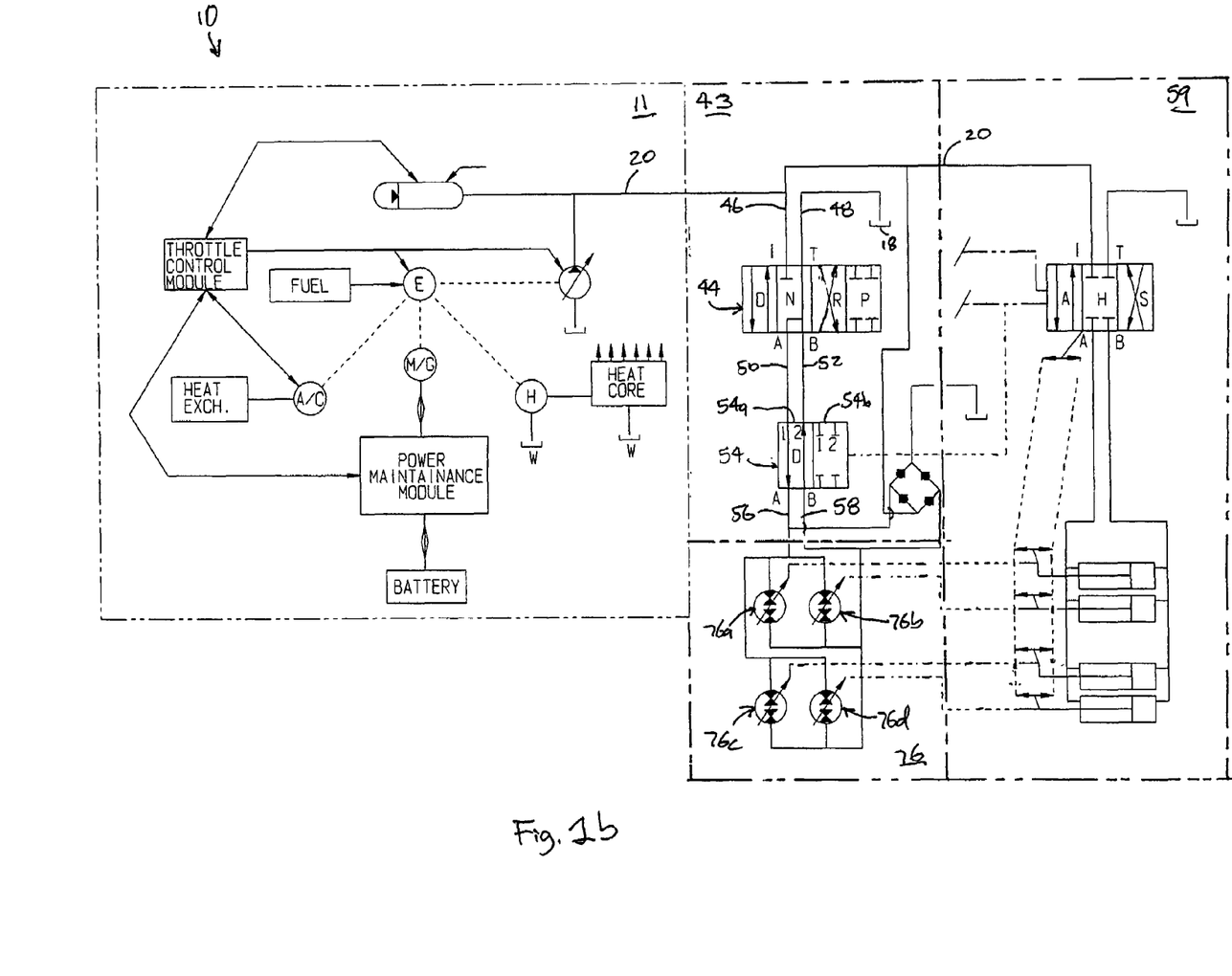
FIG. 1b is a view of the hydraulic hybrid powertrain system of FIG. 1a with the mode select valve in a "Neutral" position.

Referring to FIG. 1b, when the mode select valve 44 is in the N or neutral position, and the brake override device 54 is in the 54a position, hydraulic fluid will flow through the conduit 46 but will be prevented from flowing through the mode select valve 44 by the cap adjacent the conduit 46 in the N position. The outlet conduits 50 and 52 are in fluid communication with the lower pressure hydraulic fluid in the conduit 48 and, therefore, there is no fluid flow through the brake override device 54 or to the motors 76a-76d, as the pressure in the conduits 50 and 56 will balance with the pressure in the conduits 52 and 58. When the in N position, oil from the reservoir 18 is available to flow through to the motors 76a-76d should any of the motors 76a-76d require oil flow.

Figure 1C:
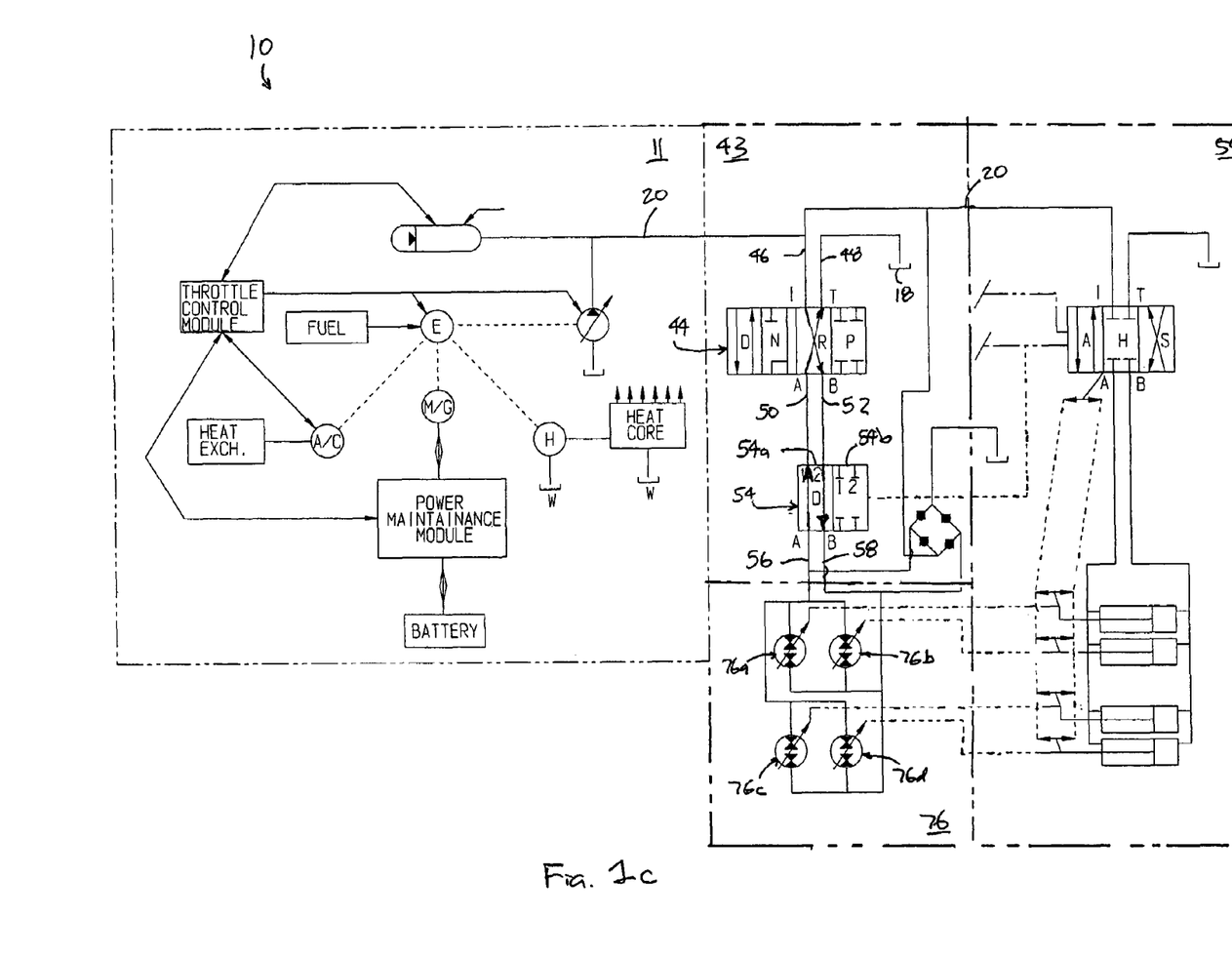
FIG. 1c is a view of the hydraulic hybrid powertrain system of FIG. 1a with the mode select valve in a "Reverse" position.
Figure 1E:
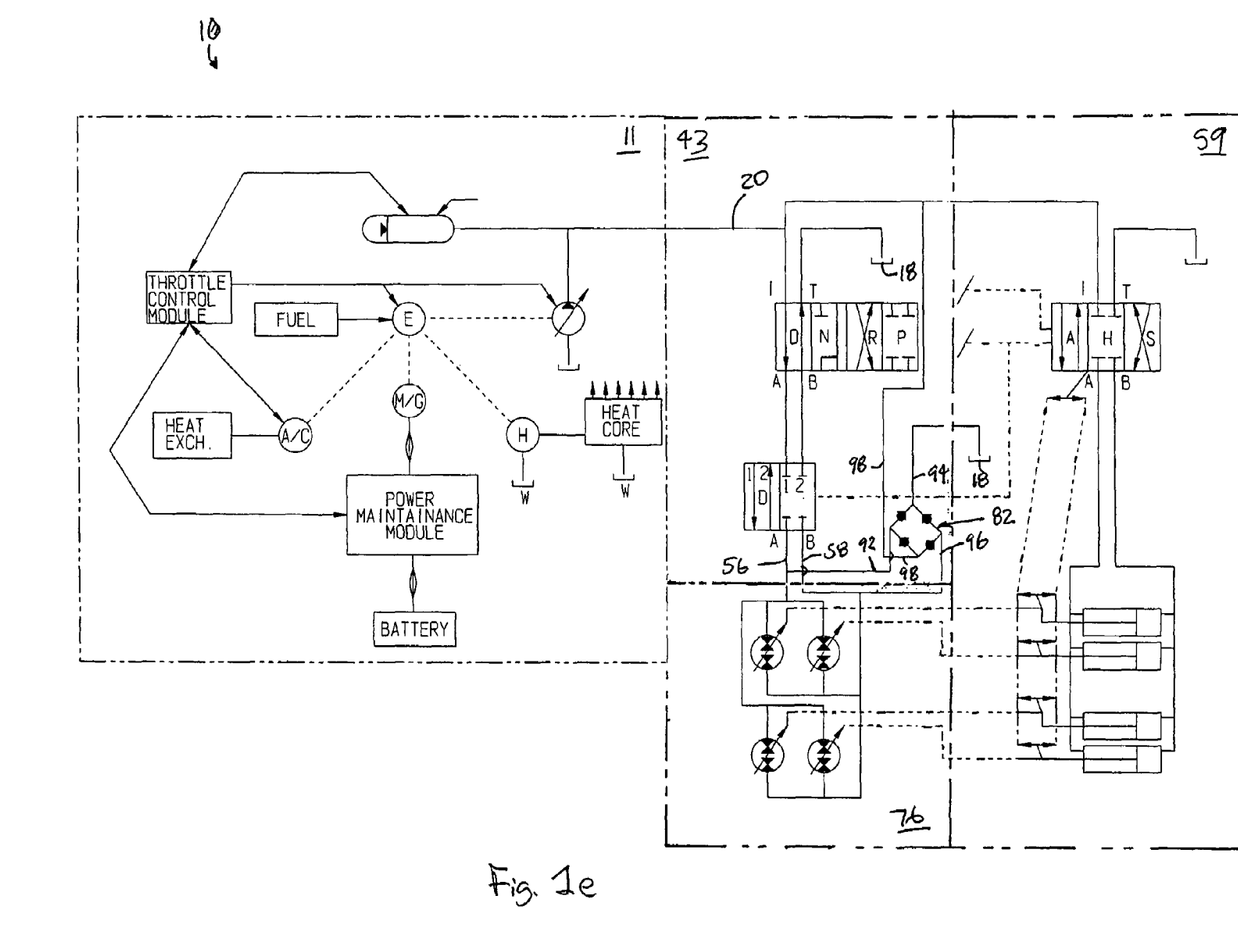
FIG. 1e is a view of the hydraulic hybrid powertrain system of FIG. 1a with a brake override device in an override position.

Referring to FIG. 1c, when the mode select valve 44 is in the R or reverse position, and the brake override device 54 is in the 54a position, hydraulic fluid will flow through the conduit 46, through the mode select valve 44 and out the conduit 52 in the direction shown by the arrow in the R position, through the brake override device 54 and out the conduit 58 in the direction shown by the arrow in the 54a position, and to the respective lower ports 78a-78d of the motors 76a-76d, through the motors 76a-76d and to the respective upper ports 77a-77d, dropping in pressure and providing an output torque in a reverse direction for each of the motors 76a-76d in a manner known to those skilled in the art. The lower pressure hydraulic fluid in the lower ports 77a-77d travels through the conduit 56, through the brake override device and out the conduit 50 in the direction shown by the arrow in the 54a position, and through the mode select valve 44 and out the conduit 48 in the direction shown by the arrow in the D position to the hydraulic fluid source 18.

Referring to FIG. 1d, when the mode select valve 44 is in the P or park position, and the brake override device 54 is in the 54a position, hydraulic fluid will not flow through any of the conduits 46, 48, 50, and 52 as the caps adjacent each of the conduits 46, 48, 50, and 52 in the P position prevent any flow through to the motors 76a-76d.

As outlined above, in the first position 54a, the brake override device 54 allows hydraulic fluid to flow (depending on the position of the mode select valve 44) between the conduits 50 and 56, and between the conduits 52 and 58. In the second position 54b, however, best seen in FIG. 1e, hydraulic fluid will not flow through any of the conduits 50, 52, 56, and 58 as the caps adjacent each of the conduits 50, 52, 56, and 58 in the second position 54b prevent any flow through the brake override device 54. The brake override device 54 is moved from its normal first position 54a to the second position 54b by actuation of the brake 72 and the transmission of a signal along the connector 73 and prevents hydraulic fluid flow from the displacement control valve 44 to the motors 76a-76d.

In operation, if the brake 72 is engaged when the mode select valve 44 is in the D or drive position, and the override device 54 is moved to the second position 54b, the only source of hydraulic fluid for the motors 76a-76d is through the check valve bridge circuit 82 and, therefore, all fluid flow is routed through the check valve bridge circuit 82. During braking, the motors 76a-76d will begin to function as pumps, advantageously recapturing energy from the rotation of the vehicle wheels during braking. When braking in the D position, hydraulic fluid will flow from the hydraulic fluid source 18, through the conduit 94, through the check valve 86, through the conduit 92, to the upper ports 77-77d and to the motors 76a-76d, where the hydraulic fluid pressure is raised. High pressure hydraulic fluid will then flow from the motors 76a-76d, through the lower ports 78a-78d, through the conduit 96, and, if the pressure in the conduit 96 is greater than the conduit 98, through the check valve 90 and into the conduit 98, where the high pressure hydraulic fluid flows to the conduit 20 and recharges the accumulator 38.

When braking while the mode select valve 44 is in the R position, hydraulic fluid will flow from the hydraulic fluid source 18, through the conduit 94, through the check valve 88, through the conduit 96, to the lower ports 78a-78d and to the motors 76a-76d, where the hydraulic fluid pressure is raised. High pressure hydraulic fluid will then flow from the motors 76a-76d, through the upper ports 77a-77d, through the conduit 92, and, if the pressure in the conduit 92 is greater than the conduit 98, through the check valve 84 and into the conduit 98, where the high pressure hydraulic fluid flows to the conduit 20 and recharges the accumulator 38.

The check valve bridge circuit 82 functions to prevent flow of hydraulic fluid to the motors 76a-76d in a reverse direction once the vehicle has come to a complete stop. When braking and when the mode select valve 44 is in the D position, the brake override device 54 moves to the position 54b and prevents flow from the mode select valve 44 to the motors 76a-76d. Flow from the high pressure conduit 20 will attempt to reach the motors 76a-76d via the conduit 98 but is prevented from flowing to the motors via the check valves 84 and 90. The check valve bridge circuit 82 will allow flow to the conduit 98 only from the conduit 92 through the check valve 84 or from the conduit 96 via the check valve 90, which will only occur when the pressure in the conduits 56 and 92 or the conduits 58 and 96 are greater than the pressure in the conduit 98. If the pressure in the conduit 92 is less than the pressure in the conduit 98 and the conduit 94, the check valve 86 will open but since the conduit 94 is at a low pressure, no flow can occur from the reservoir 18 to the conduit 92. Similarly if the pressure in the conduit 96 is less than the pressure in the conduit 98 and the conduit 94, the check valve 88 will open but since the conduit 94 is at a low pressure, no flow can occur from the reservoir 18 to the conduit 96, and advantageously preventing high pressure hydraulic fluid from causing the motors 76a-76d to engage in a reverse direction after the vehicle has come to a complete stop.

In operation, the flow of the hydraulic fluid through the system 10 is controlled by the operator via the accelerator 70 and the brake 72 connected to the displacement control valve 60. The connector 80 and the connections 75a-75d are connected together via suitable linkage or the like, which allows the motors 76a-76d to provide feedback to the displacement control valve 60 via the connections 75a-75d in a similar manner as the connector 80 provides control to the motors 76a-76d through the connections 75a-75d.

For example, if a user (not shown) of the vehicle presses the accelerator 70, this causes the feedback connector 80 to move in an acceleration direction and causes the displacement control valve 60 to move toward the position 60a. High pressure fluid from the conduit 62 will flow through the ports on the displacement control valve 60, increasing the pressure in the conduit 66 and flowing to the cylinders 74a-74d. Since the pressure in the conduit 66 will be greater than the pressure in the conduit 68, the connectors 75a-75d will be moved in an acceleration direction, increasing the displacement and, therefore, the output torque of the motors 76a-76d.

Once a desired output torque of the motors 76a-76d has been reached, the motors 76a-76d will throttle back, moving the connectors 75a-75d in a deceleration direction, decreasing the pressure in the conduit 66 and increasing the pressure in the conduit 68. This movement is translated back to the displacement control valve 60 by the feedback connector 80, which moves the displacement control valve towards the position 60b. In the position 60b, there is no flow through the displacement control valve 60 and thus the connectors 75a-75b remain stationary and the displacement and, therefore, the output torque of the motors 76a-76d remains constant.

If the user removes his or her foot from the accelerator 70, this causes the feedback connector 80 to move in a deceleration direction and causes the displacement control valve 60 to move toward the position 60c. High pressure fluid from the conduit 62 will flow through the ports on the displacement control valve 60, increasing the pressure in the conduit 68 and flowing to the cylinders 74a-74d. Since the pressure in the conduit 68 will be greater than the pressure in the conduit 66, the connectors 75a-75d will be moved in a deceleration direction, decreasing the displacement and, therefore, the output torque of the motors 76a-76d.

Advantageously, there is no direct connection between the accelerator 70 and the engine 12. Rather, the engine 12 is operated and controlled based on a combination of engine speed (based on the signal on the line 42), torque (based on the position of the displacement control valve 60, which is affected by the position of the accelerator 70), and system pressure (based on the signal on the line 38a). This combination of inputs allows the throttle control module 40 of the system 10 to always run the engine 12 at its peak efficiency, based on known engine efficiency parameters and, therefore, provide proportional control of the engine 12 and system 10. At times when the system 10 is fully charged, the engine 12 can be advantageously turned off, reducing the instant fuel consumption to zero. When the system pressure drops, the engine 12 is restarted to again provide pressure to the conduit 20.

Based on the condition or operating state of the air conditioning compressor 24, the power maintenance module 28, and the accumulator 38 (as determined by their respective signals on the lines 24a, 28a, and 38a), the throttle control module 40 sends a signal on the line 42 to start or stop the engine 12 and/or vary the displacement of the pump/motor 16.

As the system pressure in the conduit 20 increases, the accumulator 38 fills and the rate of flow from the pump/motor 16 is reduced. The flow of the pump/motor 16 continues to be reduced until the system pressure drops due to an output to the motors 76a-76d. If at any time the flow of the pump/motor 16 reaches zero flow, the engine 12 may be turned off until flow is again needed. The flow of the pump/motor 16 may also be reduced if an accessory requires power to prevent the engine 12 from stalling (assuming the accessory is clutched to the engine 12). The powertrain system 10 obtains its efficiency by averaging the rate of power consumption. Energy needed for intermittent bursts is supplied by the stored energy in the accumulator 38. The pump/motor 16 provides flow greater than the average flow needed to propel the vehicle. The extra flow created by the pump 16 is then stored in the accumulator 38.

The hydraulic hybrid powertrain system 10 in accordance with the present invention advantageously providing an uncomplicated and straightforward control methodology and a very responsive control means for the system 10 by virtue of the fact that output torque response from the motors 76a-76d, once their displacement is increased, is very quick.

Those skilled in the art will appreciate that the system 10 in accordance with the present invention may be utilized to supply hydraulic power to any number of systems including, but not limited to, a propulsion system for a floating or submersible vessel such as a ship, a boat, or a submarine, a propulsion system for a helicopter, among others. In short, the output of the pump/motor 16 could be utilized with the powertrain system 10 to run any number of hydraulic motors, such as the motors 76a-76d for any number of purposes while remaining with the scope of the present invention.

The connectors 73, 75a-75d, and 80, and the signals on the lines 24a, 28a, 38a, and 42 may be any type of mechanical connector, such as a hydraulic line, a cable, a metal bar or the like, or an electrical signal communicating with solenoid valves or the like, while remaining within the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A hydraulic hybrid powertrain system comprising:
a power plant generating a high pressure fluid at an output;
at least one drive motor responsive to said high pressure fluid for generating rotary motion at an output;
a mode selection means connected to said power plant output and said at least one drive motor for selecting a mode of operation from a plurality of modes of operation of said at least one drive motor including at least two of a drive mode, a neutral mode, a reverse mode and a park mode;
a control means connected to said power plant and said at least one drive motor for controlling operation of said at least one drive motor in said plurality of modes of operation;
a selectively actuated brake means for interrupting a flow of the high pressure fluid to said at least one drive motor; and
a check valve bridge circuit for connecting said at least one drive motor to a low pressure fluid source when said brake means is actuated.

2. The system according to claim 1 wherein said power plant includes an engine driving a hydraulic pump/motor to generate said high pressure fluid.

3. The system according to claim 1 wherein said mode selection means includes a mode select valve for connecting said at least one drive motor between said power plant output and a low pressure fluid source in said drive mode and said reverse mode, disconnecting said at least one drive motor from said power plant output and connecting to said low pressure fluid source in said neutral mode, and disconnecting said at least one drive motor from said power plant output and said low pressure fluid source in said park mode.

4. The system according to claim 3 wherein said mode selection means includes a brake override means normally connecting said at least one drive motor between said power plant and said low pressure source and upon actuation by a brake disconnecting said at least one drive motor from said power plant and said low pressure source.

5. The system according to claim 1 wherein said at least one drive motor is a variable displacement pump/motor and said control means selectively varies a displacement of said pump/motor.

6. The system according to claim 5 wherein said control means includes a displacement control valve and a hydraulic actuator connected to said power plant output and said low pressure source, said hydraulic actuator being connected to said at least one drive motor for varying the displacement.

7. The system according to claim 6 wherein said displacement control valve has an acceleration position, a hold position and a deceleration position causing said at least one drive motor to speed up, maintain speed and slow down respectively.

8. A hydraulic hybrid powertrain system comprising:
a power plant generating a high pressure fluid at an output;
at least one variable displacement drive motor responsive to said high pressure fluid for generating rotary motion at an output;
a mode selection means connected to said power plant output and said at least one drive motor for selecting a mode of operation of said at least one drive motor;
a control means connected to said power plant and said at least one drive motor for controlling a displacement of said at least one drive motor in response to an accelerator input and a brake input to said control means; and
a selectively actuated brake means for interrupting a flow of the high pressure fluid from said power plant to said at least one drive motor.

9. The system according to claim 8 including a check valve bridge circuit for connecting said at least one drive motor to a low pressure fluid source when said brake means is actuated.

10. The system according to claim 8 wherein said mode selection means includes a mode select valve for connecting said at least one drive motor between said power plant output and a low pressure fluid source in a drive mode and a reverse mode, disconnecting said at least one drive motor from said power plant output and connecting to said low pressure fluid source in a neutral mode, and disconnecting said at least one drive motor from said power plant output and said low pressure fluid source in a park mode.

11. The system according to claim 10 wherein said mode selection means includes a brake override means normally connecting said at least one drive motor between said power plant and said low pressure source and upon actuation by a brake disconnecting said at least one drive motor from said power plant and said low pressure source.

12. The system according to claim 8 wherein said control means includes a displacement control valve and a hydraulic actuator connected to said power plant output and a low pressure source, said hydraulic actuator being connected to said at least one drive motor for varying the displacement.

13. The system according to claim 12 wherein said displacement control valve has an acceleration position, a hold position and a deceleration position causing said at least one drive motor to speed up, maintain speed and slow down respectively.

14. The system according to claim 12 including a feedback connector connected between said displacement control valve and said hydraulic actuator.

15. A hydraulic hybrid powertrain system, comprising:
a power plant including an engine driving a pump connected to a low pressure fluid source to generate high pressure fluid at an output;
at least one variable displacement pump/motor responsive to said high pressure fluid for generating rotary motion at an output;
a mode selection means connected for fluid communication between said power plant output and said at least one pump/motor;
a control means connected to said power plant outlet and said at least one pump/motor for selectively controlling a displacement of said at least one pump/motor in response to accelerator and brake inputs;
a brake override means connected between said mode selection means and said at least one pump/motor, said brake override means being responsive to said brake input for preventing a flow of said high pressure fluid to said at least one pump/motor.

16. The system according to claim 15 including a check valve bridge circuit for connecting said at least one pump/motor for fluid flow from said low pressure fluid source to said power plant output when said brake means is actuated.

17. The system according to claim 15 wherein said control means includes a displacement control valve and a hydraulic actuator connected to said power plant output and said low pressure source, said hydraulic actuator being connected to said at least one drive motor for varying the displacement.

18. The system according to claim 17 wherein said displacement control valve has an acceleration position, a hold position and a deceleration position causing said at least one drive motor to speed up, maintain speed and slow down respectively.

19. The system according to claim 18 including a feedback connector connected between said displacement control valve and said hydraulic actuator.

20. A hydraulic hybrid powertrain system comprising;
   a power plant generating a high pressure fluid at an output;
   at least one drive motor responsive to said high pressure fluid for generating rotary motion at an output;
   a mode selection means connected to said power plant output and said at least one drive motor for selecting a mode of operation of said at least one drive motor;
   a control means connected to said power plant and said at least one drive motor for controlling operation of said at least one drive motor in said mode of operation; and
   a check valve bridge circuit for connecting said at least one drive motor to a low pressure fluid source when a brake means is actuated.

21. The system according to claim 20 wherein said brake means is selectively actuated for interrupting a flow of the high pressure fluid to said at least one drive motor.

22. The system according to claim 20 wherein said power plant includes an engine driving a hydraulic pump/motor to generate said high pressure fluid.

23. The system according to claim 20 wherein said mode selection means includes a mode select valve for connecting said at least one drive motor between said power plant output and a low pressure fluid source in said drive mode and said reverse mode, disconnecting said at least one drive motor from said power plant output and connecting to said low pressure fluid source in said neutral mode, and disconnecting said at least one drive motor from said power plant output and said low pressure fluid source in said park mode.

24. The system according to claim 23 wherein said mode selection means includes a brake override means normally connecting said at least one drive motor between said power plant and said low pressure source and upon actuation by a brake disconnecting said at least one drive motor from said power plant and said low pressure source.

25. The system according to claim 20 wherein said at least one drive motor is a variable displacement pump/motor and said control means selectively varies a displacement of said pump/motor.

26. The system according to claim 25 wherein said control means includes a displacement control valve and a hydraulic actuator connected to said power plant output and said low pressure source, said hydraulic actuator being connected to said at least one drive motor for varying the displacement.

27. The system according to claim 26 wherein said displacement control valve has an acceleration position, a hold position and a deceleration position causing said at least one drive motor to speed up, maintain speed and slow down respectively.

* * * * *